(12) United States Patent
Kunisada

(10) Patent No.: US 9,434,440 B2
(45) Date of Patent: Sep. 6, 2016

(54) SUPPORTING STRUCTURE FOR REAR PARTS OF MOTORCYCLE

(71) Applicant: Kawasaki Jukogyo Kabushiki Kaisha, Kobe-shi, Hyogo (JP)

(72) Inventor: Youhei Kunisada, Kobe (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 14/928,781

(22) Filed: Oct. 30, 2015

(65) Prior Publication Data

US 2016/0052586 A1 Feb. 25, 2016

Related U.S. Application Data

(63) Continuation of application No. PCT/JP2014/060866, filed on Apr. 16, 2014.

(30) Foreign Application Priority Data

May 10, 2013 (JP) .................. 2013-100148
Jun. 14, 2013 (JP) .................. 2013-125296

(51) Int. Cl.
*B62K 19/00* (2006.01)
*B62J 25/00* (2006.01)
(Continued)

(52) U.S. Cl.
CPC ............. *B62K 19/00* (2013.01); *B62J 9/001* (2013.01); *B62J 25/00* (2013.01); *B62K 11/00* (2013.01);
(Continued)

(58) Field of Classification Search
CPC .... B62J 9/001; B62J 25/00; B62K 2025/048

USPC .......................................... 280/830
See application file for complete search history.

(56) References Cited

U.S. PATENT DOCUMENTS

| | | | | |
|---|---|---|---|---|
| 4,096,980 A | * | 6/1978 | Clow | B62J 11/00 224/413 |
| 5,275,264 A | * | 1/1994 | Isella | F16F 9/464 188/299.1 |

(Continued)

FOREIGN PATENT DOCUMENTS

| JP | 05-085457 | 4/1993 |
|---|---|---|
| JP | 08-216953 | 8/1996 |

(Continued)

OTHER PUBLICATIONS

International Search Report for PCT/JP2014/060866, filed Apr. 16, 2014.

(Continued)

*Primary Examiner* — Joseph Rocca
*Assistant Examiner* — Michael Stabley

(57) ABSTRACT

A supporting structure includes: a step stay which is mounted to a motorcycle frame structure and configured to support a foot step for a passenger; an unit supporting portion provided at the step stay and configured to support an operation unit for manually adjusting a characteristic of a rear wheel shock absorber; a pannier supporting portion provided at the step stay and configured to support a front portion of a pannier mounted to a side portion of a motorcycle body; and a tank supporting portion configured to support a reservoir tank for brake oil. The pannier is disposed rearward of the operation unit, and an operation portion of the operation unit is disposed at a position at which overlap of the operation portion with the step stay and the pannier is avoided as viewed from an outer lateral side.

6 Claims, 6 Drawing Sheets

(51) Int. Cl.
*F01N 13/08* (2010.01)
*F01N 13/18* (2010.01)
*B62K 25/28* (2006.01)
*B62J 9/00* (2006.01)
*B62K 11/00* (2006.01)
*B62K 25/04* (2006.01)

(52) U.S. Cl.
CPC ............ *B62K 25/283* (2013.01); *F01N 13/08* (2013.01); *F01N 13/1805* (2013.01); *B62K 2025/048* (2013.01); *F01N 2590/04* (2013.01)

(56) References Cited

U.S. PATENT DOCUMENTS

| | | | | |
|---|---|---|---|---|
| 5,921,572 | A * | 7/1999 | Bard | B60G 17/0152 280/284 |
| 5,971,116 | A * | 10/1999 | Franklin | B60G 17/0152 188/266.2 |
| 6,068,075 | A * | 5/2000 | Saiki | B62J 9/00 180/219 |
| 6,543,799 | B2 * | 4/2003 | Miyoshi | B62K 25/04 280/283 |
| 6,612,599 | B2 * | 9/2003 | Miyoshi | B62K 25/04 188/282.4 |
| 7,278,560 | B2 * | 10/2007 | Aron | B62J 9/00 224/413 |
| 7,686,318 | B2 | 3/2010 | Kouchi et al. | |
| 7,703,585 | B2 * | 4/2010 | Fox | B62K 25/04 188/278 |
| 8,162,091 | B2 * | 4/2012 | Laperle | B60R 9/02 180/219 |
| 8,458,080 | B2 * | 6/2013 | Shirai | B62K 25/04 280/283 |
| 8,596,400 | B2 * | 12/2013 | Muroo | B62J 21/00 180/219 |
| 8,646,669 | B2 * | 2/2014 | Mann | B62J 25/00 224/413 |
| 2007/0062327 | A1 | 3/2007 | Kouchi et al. | |
| 2012/0253599 | A1 * | 10/2012 | Shirai | B62K 25/04 701/37 |

FOREIGN PATENT DOCUMENTS

| | | |
|---|---|---|
| JP | 2002-264868 | 9/2002 |
| JP | 2007-076499 | 3/2007 |
| JP | 2008-018891 | 1/2008 |
| JP | 2010-234913 | 10/2010 |
| JP | 2012-076485 | 4/2012 |

OTHER PUBLICATIONS

International Preliminary Report on Patentability and Written Opinion of the International Searching Authority dated Nov. 10, 2015 with English Translation (mailing date Nov. 19, 2015) for International PCT Patent Application No. PCT/JP2014/060866, filed Apr. 16, 2014 (8 pages).

* cited by examiner

SUPPORTING STRUCTURE FOR REAR PARTS OF MOTORCYCLE

CROSS REFERENCE TO THE RELATED APPLICATION

This application is a continuation application, under 35 U.S.C §111(a) of international application No. PCT/JP2014/060866, filed Apr. 16, 2014, which claims priority to Japanese patent application No. 2013-100148, filed May 10, 2013, and Japanese patent application No. 2013-125296, filed Jun. 14, 2013, the entire disclosures of which are herein incorporated by reference as a part of this application.

BACKGROUND OF THE INVENTION

1. Field of the Invention

The present invention relates to a supporting structure which supports a plurality of parts at a rear portion of a motorcycle body.

2. Description of Related Art

At a rear portion of a motorcycle body, rear parts such as an operation unit for a rear wheel shock absorber, a pannier or storage box and a reservoir tank for a rear brake may be mounted. A supporting structure for these rear parts has been known in which the operation unit and the pannier are supported by a step stay which supports a foot step for resting passenger's foot (see Patent Document 1).

RELATED DOCUMENT

Patent Document

[Patent Document 1] JP Laid-open Patent Publication No. 2010-234913

The above-described supporting structure disclosed in Patent Document 1 has an advantage in that the supporting structure is simplified by using the step stay also as a supporting member for the operation unit and the pannier. However, a part of a manual operation portion of the operation unit overlaps the step stay at the inner side of the step stay as viewed from a motorcycle body lateral side, and thus the operability when the operation unit is accessed from a motorcycle body outer lateral side is poor. In addition, since the step stay is used also as the supporting member for only the operation unit and the pannier among a plurality of the rear parts, it is hard to evaluate that the step stay is sufficiently effectively used as a supporting member.

SUMMARY OF THE INVENTION

In view of the above-described problem, an object of the present invention is to provide a supporting structure for rear parts of a motorcycle which supporting structure allows an operation unit to be mounted to a step stay in such an arrangement that high operability of the operation unit is secured and which supporting structure is able to effectively use the step stay for supporting other rear parts.

In order to achieve the above-described object, a supporting structure for rear parts of a motorcycle according to the present invention includes: a step stay mounted to a motorcycle frame structure and configured to support a foot step for a passenger; a unit supporting portion provided at the step stay and configured to support an operation unit for manually adjusting a characteristic of a rear wheel shock absorber; a pannier supporting portion provided at the step stay and configured to support a front portion of a pannier mounted to a side portion of a motorcycle body; and a tank supporting portion configured to support a reservoir tank for brake oil. The pannier supporting portion is disposed rearward of the unit supporting portion, and an operation portion of the operation unit is disposed at a position at which overlap of the operation portion with the step stay and the pannier is avoided as viewed from an outer lateral side.

According to the supporting structure for the rear parts, the operation portion of the operation unit is supported by the step stay at the position at which overlap of the operation portion with the step stay and the pannier is avoided as viewed from the outer lateral side, that is, in such an arrangement that the entirety of the operation portion is exposed to the outer lateral side. Thus, it is possible to ensure excellent operability of the operation unit. In addition, the step stay not only supports the operation unit and the pannier but also serves as a supporting member for the reservoir tank. Thus, the step stay is sufficiently effectively used as a supporting member, and it is not necessary to additionally provide a supporting member for the reservoir tank.

In the present invention, the step stay preferably includes a muffler supporting portion configured to support a muffler. Thus, the step stay supports the muffler, in addition to the operation unit, the pannier and the reservoir tank. Therefore, the step stay is further sufficiently effectively used as a supporting member, and it is not necessary to additionally provide a supporting member for the muffler. In addition, since both the pannier and the muffler are supported by the step stay, it is possible to ensure a positional relationship therebetween and to prevent the pannier from being excessively close to the muffler having a high temperature.

In the present invention, the operation unit is preferably supported by the step stay via a unit vibration isolating member. Thus, vibration transmitted from the step stay to the operation unit during the motorcycle travelling is suppressed, whereby it is possible to prevent unexpected actuation of the operation unit due to the vibration.

In the present invention, the pannier is preferably supported by the step stay via a pannier vibration isolating member. Thus, vibration transmitted from the pannier supporting portion of the step stay to the pannier during the motorcycle travelling is attenuated, whereby it is possible to suppress an article stored in the pannier from vibrating.

In the present invention, preferably, the operation unit has a rotation axis set so as to be substantially parallel to a lower edge of a rear frame of the motorcycle body which lower edge extends rearward and upward, in which case, the tank supporting portion is disposed rearward of and below the unit supporting portion, and the pannier supporting portion is disposed rearward of the tank supporting portion. Thus, the operation unit is inclined so as to extend rearward and upward, whereby a large space appears rearward of and below the operation unit. Therefore, the tank supporting portion for the reservoir tank and the pannier supporting portion for the pannier are easily disposed rearward of and below the unit supporting portion so as to be sufficiently away from the operation portion of the operation unit.

In the present invention, an indicator or a tick mark for indicating an amount of operation of the operation unit is preferably provided on the operation unit. Thus, by manually operating the operation portion while viewing the tick mark on the operation unit, it is possible to quickly and accurately adjust the characteristic of the rear wheel shock absorber, whereby the operability of the operation unit improves.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
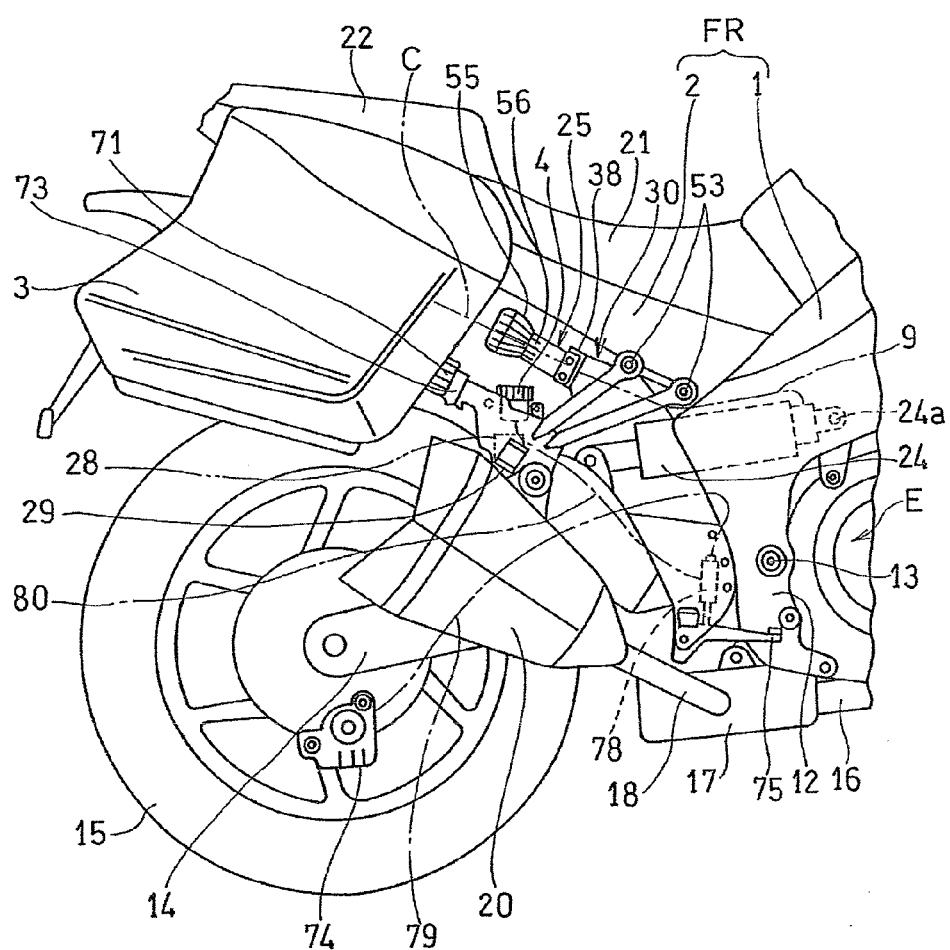
FIG. 1 is a side view showing a rear portion of a motorcycle including a supporting structure for rear parts according to a preferred embodiment of the present invention.

Hereinafter, preferred embodiments of the present invention will be described in detail with reference to the drawings. FIG. 1 is a side view of a motorcycle including a supporting structure for rear parts according to a preferred embodiment of the present invention. A motorcycle frame structure FR for the motorcycle includes: a main frame 1 which forms a front half of the motorcycle frame structure FR; and a rear frame 2 which is connected to a rear portion of the main frame 1 and forms a rear half of the motorcycle frame structure FR. A front wheel is supported by a front end portion of the main frame 1 via a front fork (not shown). A swingarm bracket 12 is provided at a lower portion of the rear end of the main frame 1, and a swingarm 14 is supported by the swingarm bracket 12 via a pivot shaft 13 at a front end portion thereof so as to be able to swing in a vertical direction. A rear wheel 15 is supported by a rear end portion of the swingarm 14. A combustion engine E is supported by a lower portion of the main frame 1, and the rear wheel 15 is driven by the engine E. The engine E is, for example, a parallel multi-cylinder four-cycle combustion engine.

Exhaust gas of the engine E passes through an exhaust pipe 16, extending rearward via the front side and the lower side of the engine E, and enters a muffler chamber 17. Then, the exhaust gas passes, after being silenced in the muffler chamber 17, through a connection pipe 18, and enters a muffler 20 at the right side of the rear wheel 15 to be further silenced. Finally, the exhaust gas is discharged from the muffler 20 to the outside.

A rider's seat 21 and a passenger's seat 22 are supported by the rear frame 2. A rear fender (not shown) is mounted to a lower portion of the rear frame 2. A single rear wheel shock absorber 24 is disposed below the rider's seat 21 so as to extend substantially in a front-rear or longitudinal direction of the motorcycle body and be connected between the main frame 1 and the swingarm 14. A step stay 30 is mounted to the rear frame 2 below the rider's seat 21 and above the muffler 20, which stay 30 supports a foot step 28 which is a footrest for a passenger. The foot step 28 and the step stay 30 are provided at each of the right and left sides.

The step stay 30 includes supporting portions for various rear parts, in addition to a step supporting portion 29 including a pair of projections. That is, an operation unit 25 is mounted to an upper portion of the step stay 30. The operation unit 25 adjusts the hydraulic characteristic of the rear wheel shock absorber 24 connected at a front end portion 24a thereof to a cross member (not shown) of the motorcycle frame structure FR, via a hydraulic hose 9 by a manual operation. A pannier 3 is disposed at a rear portion of a motorcycle body and above the rear side of the muffler 20. A front portion of the pannier 3 is supported by the step stay 30 in a state where an upper portion of the pannier 3 is supported by the rear frame 2. In addition, a reservoir tank 4 for brake oil of a rear brake and the muffler 20 are also supported by the step stay 30, and the supporting structure for them will be described in detail later.

Figure 2:
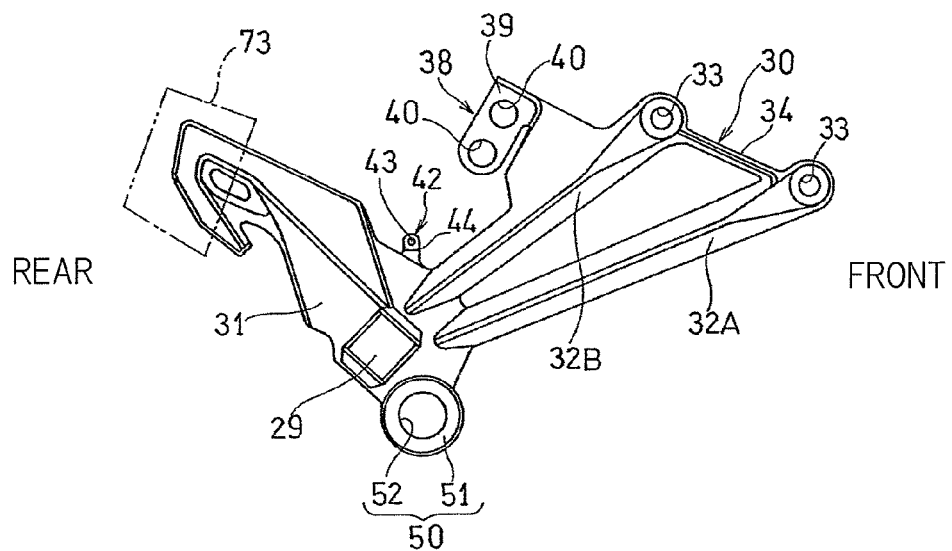
FIG. 2 is an enlarged side view of a step stay in the supporting structure in FIG. 1 as viewed from an outer side of a motorcycle body.

The shape of the step stay 30 will be described with reference to FIGS. 2 and 3. FIG. 2 is an enlarged view of the step stay 30 shown in FIG. 1. As shown in FIG. 2, the step stay 30 is an integrally molded article made of a metal, and includes a flat plate-like main body 31 which supports the foot step 29, and two mounting arm portions 32A and 32B for mounting the step stay 30 to the rear frame 2 are integrally formed with the main body 31. The mounting arm portions 32A and 32B extend obliquely frontward and upward. Each of the mounting arm portions 32A and 32B has a screw insertion hole 33 formed in an upper end portion thereof, and the upper end portions are connected to each other by a connection bar 34 for reinforcement.

At an upper portion of the rear mounting arm portion 32B, a unit supporting portion 38 to which the operation unit 25 (FIG. 1) is mounted is provided so as to project rearward. The unit supporting portion 38 includes a mounting piece 39 provided so as to project rearward from the mounting arm portion 32B, and a pair of mounting holes 40 are formed in the mounting piece 39. At a rear portion of the main body 31 of the step stay 30, a pannier supporting portion 41 which supports the front portion of the pannier 3 (FIG. 1), is provided so as to project rearward. The pannier supporting portion 41 has an outer shape which is a hook shape.

At an upper portion of the main body 31 of the step stay 30, which is located rearward of and below the unit supporting portion 38, a tank supporting portion 42 which supports the reservoir tank 4 (FIG. 1) is provided. The tank supporting portion 42 includes a mounting piece 44 provided with a threaded hole 43 and a boss 49 provided with a threaded hole 48 shown in FIG. 3. The mounting piece 44 and the boss 49 are disposed so as to be spaced apart from each other in the longitudinal direction.

The step stay 30 further includes a muffler supporting portion 50, which supports the muffler 20 (FIG. 1), on a lower end portion of the main body 31. The muffler supporting portion 50 includes: a tubular supporting body 51 which projects laterally outward from the lower end portion of the main body 31; and a circular supporting hole 52 which is concentrically formed in the supporting body 51. As described above, at the step stay 30, the unit supporting portion 38 is provided rearward of the paired mounting arm portions 32A and 32B, the tank supporting portion 42 is disposed rearward of and below the unit supporting portion 38, the pannier supporting portion 41 is disposed rearward of the tank supporting portion 42, and the muffler supporting portion 50 is disposed below the tank supporting portion 42. Thus, the respective supporting portions 38, 42, 41 and 50 are disposed with appropriate spaces maintained therebetween.

Figure 4:
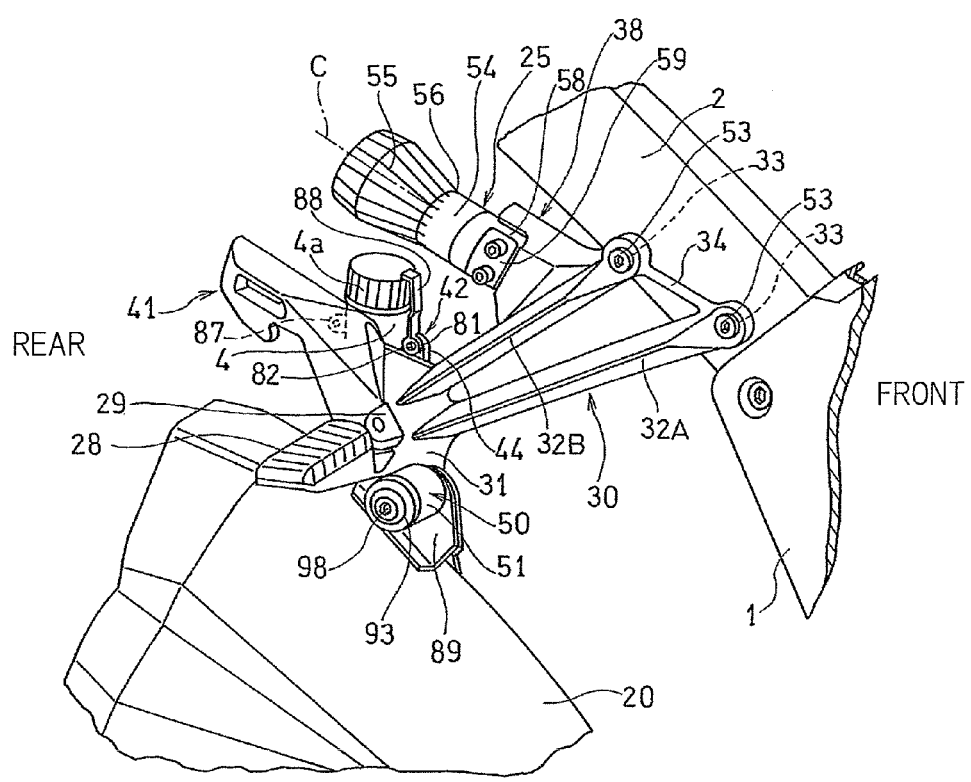
FIG. 4 is a perspective view of the supporting structure as viewed from an obliquely upward and front side.

As shown in FIG. 4, the step stay 30 is mounted to the rear frame 2 by screwing screw members 53 inserted through the screw insertion holes 33, into threaded holes (not shown) of the rear frame 2 in a state where the screw insertion holes 33 of the paired mounting arm portions 32A and 32B coincide with the threaded holes of the rear frame 2. The foot step 28 which is supported by the step supporting portion 29 is caused to stand to be in a horizontal attitude when being used, and is rotated so as to extend along a side portion of the motorcycle body to be in a stored attitude when not being used.

Figure 5:
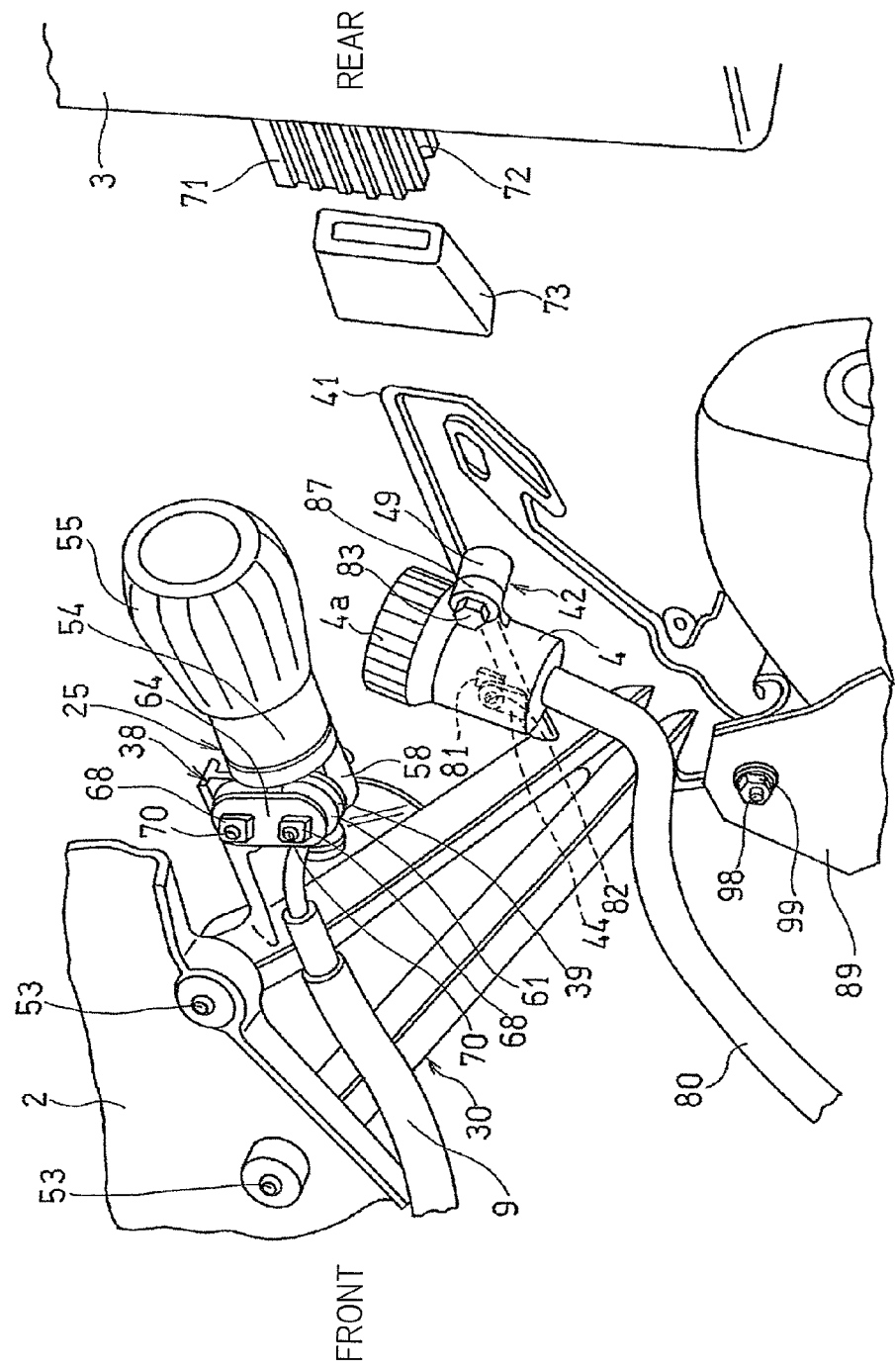
FIG. 5 is a perspective view of the supporting structure as viewed from the inner side of the motorcycle body.

The supporting structure for supporting the operation unit 25 by the unit supporting portion 38 will be described with reference to FIGS. 5 and 6. First, as shown in FIG. 5, the operation unit 25 includes a unit main body 54 and an operation portion 55, which is composed of an operation knob and is rotatably provided at a rear portion or one end portion of the unit main body 54. The unit main body 54 is connected to the rear wheel shock absorber 24 (FIG. 1) via the hydraulic hose 9. By rotating the operation portion 55 of the operation unit 25 through a manual operation, the characteristic of the rear wheel shock absorber 24 is adjusted in accordance with an amount of the rotation operation. A rotation axis C of the operation portion 55 is substantially parallel to a lower edge of the rear frame 2, which extends rearward and upward. A sufficient space, into which a hand can enter, is ensured between the operation portion 55 and the lower edge of the rear frame 2.

In order to allow a rotation operation of the operation portion 55 to be easily and accurately performed, indicators or tick marks 56 (FIG. 4) for indicating an amount of a rotation operation of the operation portion 55 are provided at locations on the unit main body 54 which are viewable from an outer lateral side of the motorcycle body. In addition, the operation unit 25 includes a mounting base portion 58 provided so as to be connected to a portion of the unit main body 54 that is opposite to the operation portion 55. The operation unit 25 is supported by the unit supporting portion 38 of the step stay 30 via the mounting base portion 58.

Figure 6:
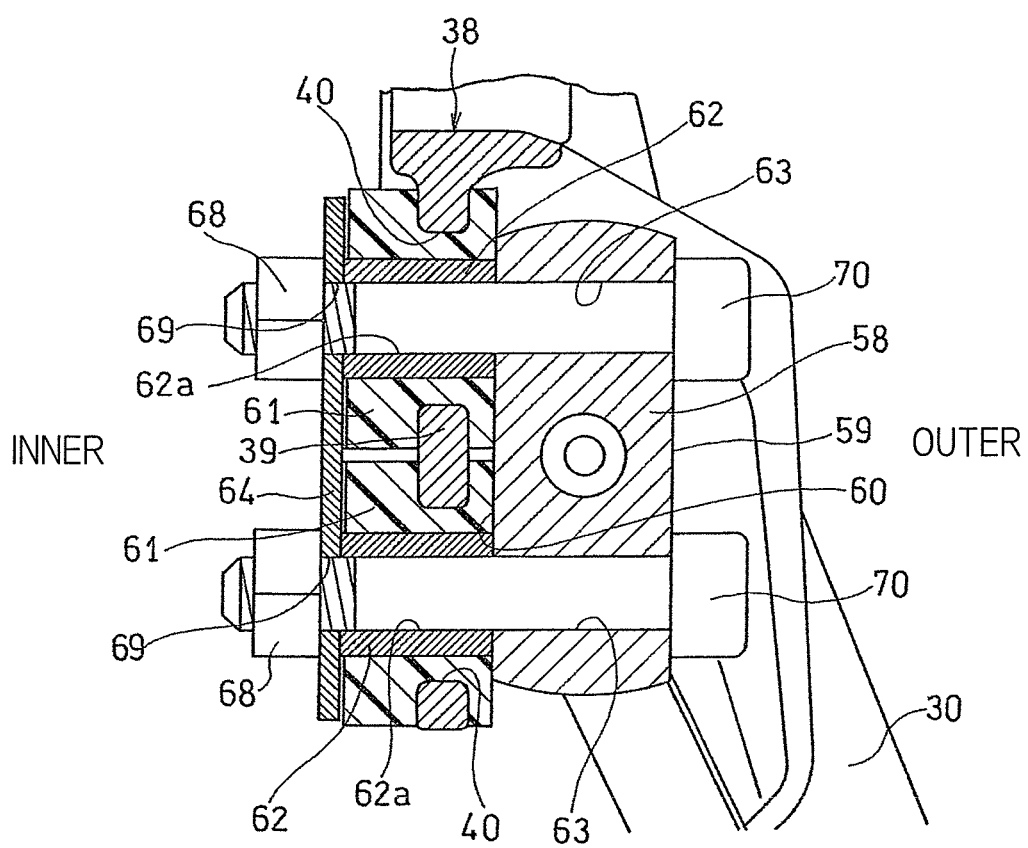
FIG. 6 is a cross-sectional view showing a supporting portion for an operation unit in the supporting structure.

As shown in FIG. 6, a fastening surface 59 and a mounting surface 60, which are flat surfaces parallel to each other, are formed on outer and inner sides of the mounting base portion 58 of the operation unit 25. Meanwhile, grommets 61 and 61, each composed of an elastic body such as rubber, are fitted into the paired mounting holes 40, 40 of the unit supporting portion 38 of the step stay 30 while the grommets 61, 61 are elastically deformed. Collars 62, 62 are inserted in hollow portions of the grommets 61, 61.

The mounting surface 60 of the mounting base portion 58 of the operation unit 25 is butted against the unit supporting portion 38 from the outside, and a mounting plate 64, provided with a pair of weld nuts 68 and screw insertion holes 69 which are concentric with the weld nuts 68, are put on the inner side of the mounting base portion 58. Then, screw members 70 are inserted from the outside into a pair of screw insertion holes 63 of the mounting base portion 58, hollow portions 62a of the collars 62 and the screw insertion holes 69 of the mounting plate 64, and then, are screwed into the weld nuts 68. Thus, the operation unit 25 is firmly mounted to the step stay 30. In this state, the grommets 61 serve as vibration isolating members and suppresses vibration transmission from the step stay 30 to the operation unit 25.

As shown in FIG. 5, a support reception portion 71, having an opening 72 opened downward and having a substantially inverted U cross-sectional shape, projects frontward from a front surface portion of the pannier 3. The pannier supporting portion 41 of the step stay 30 is fitted into a hollow portion of the support reception portion 71 through the opening 72 of the support reception portion 71 with a rubber vibration isolation cap 73 covered thereon, and supports the front portion of the pannier 3 from below.

As shown in FIG. 1, a master cylinder 78, which is driven by actuation of a brake pedal 75, is connected to a rear brake caliper 74 which brakes the rear wheel 15, via a brake hose 79. The reservoir tank 4 is connected to the master cylinder 78 via a reservoir hose 80. The reservoir tank 4 is supported by the tank supporting portion 42 of the step stay 30 with the following structure.

Figure 3:
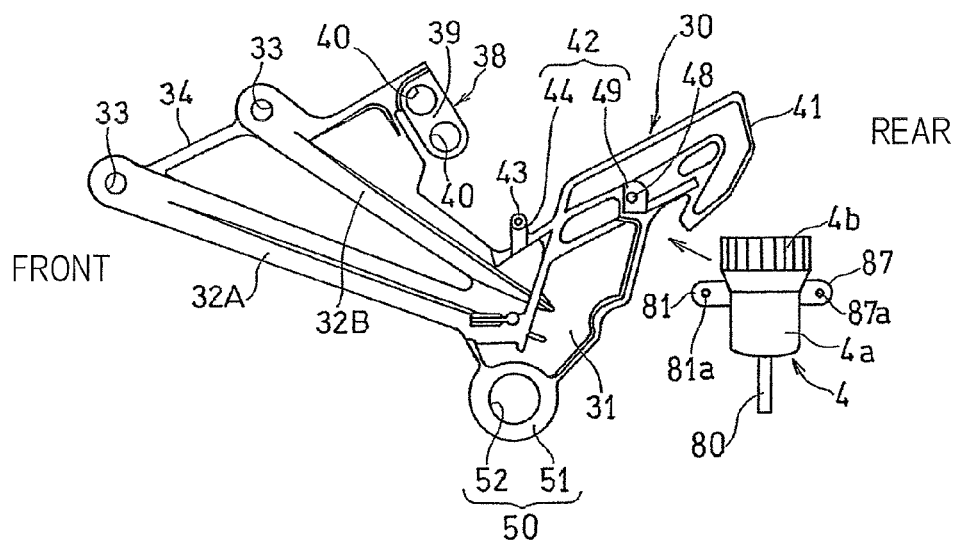
FIG. 3 is an enlarged side view of the step stay as viewed from an inner side of the motorcycle body.

First, as shown in FIG. 3, the reservoir tank 4 includes a tank body 4a and a tank cap 4b for covering an upper portion opening of the tank body 4a. The tank cap 4b is a screwed type cap which selectively open and close the upper portion opening. The reservoir tank 4 includes mounting brackets 81 and 87 at one side (front side) and the other side (rear side) thereof, respectively, and the mounting brackets 81 and 87 are provided with screw insertion holes 81a and 87a, respectively. As seen from FIG. 1, a major portion of the tank cap 4b, except for a portion of a lower portion of a rear end portion, about 90% in the present embodiment, is exposed to an outer lateral side without overlapping the step stay 30, as viewed from the outer lateral side. Therefore, the operability in manually rotating the tank cap 4b is good.

A screw member 82 is inserted into the screw insertion hole 81a of the mounting bracket 81 at the one side of the reservoir tank 4 shown in FIG. 3 from the outer side shown in FIG. 4, and then, is screwed into the threaded hole 43 (FIG. 3) of the mounting piece 44 of the step stay 30. At that time, a restriction member 88 for preventing the tank cap 4b of the reservoir tank 4 from falling off is fastened together with the mounting bracket 81 at the one side of the reservoir tank 4 to the mounting piece 44 by the screw member 82. In addition, as shown in FIG. 5, a screw member 83 is inserted from the inner side into the screw insertion hole 87a (FIG. 3) of the mounting bracket 87 at the other side (rear side) of the reservoir tank 4, and then, is screwed into the threaded hole 48 (FIG. 3) of the boss 49. Thus, the reservoir tank 4 is fastened to the tank supporting portion 42 of the step stay 30.

Figure 7:
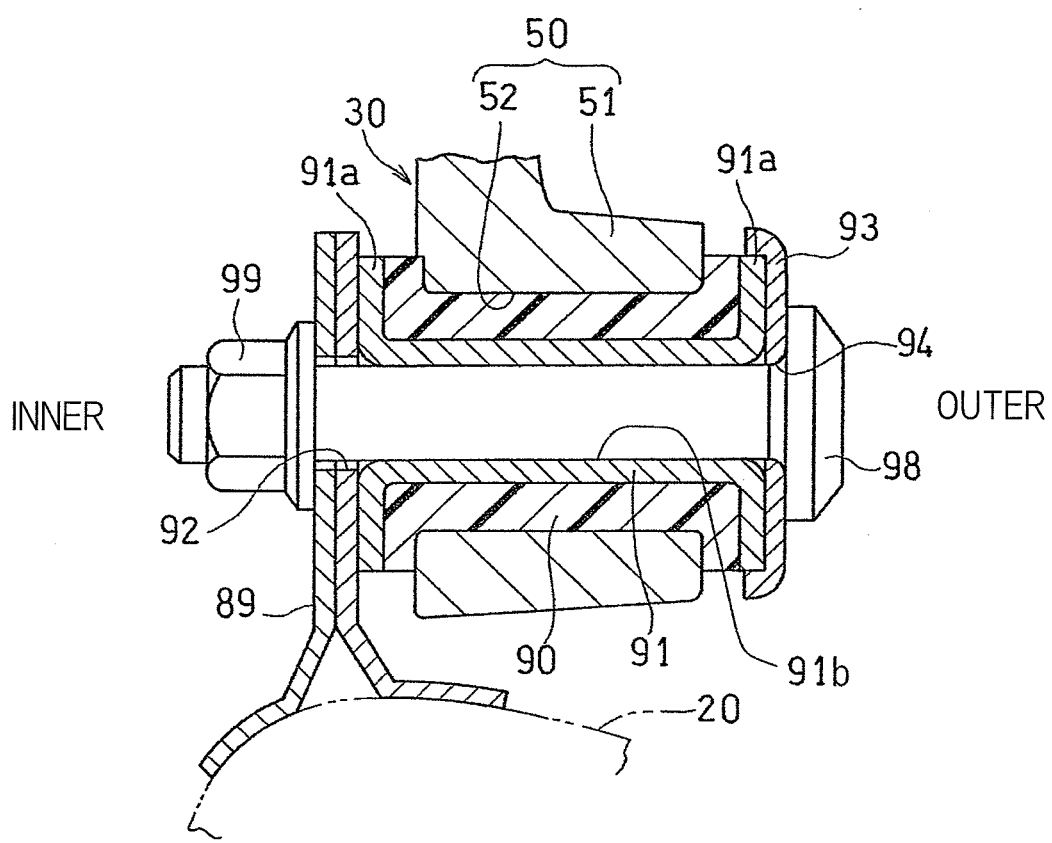
FIG. 7 is a cross-sectional view showing a supporting portion for a muffler in the supporting structure.

The supporting structure for supporting the muffler 20 by the step stay 30 will be described with reference to FIGS. 4 and 7. First, as shown in FIG. 4, a supporting piece 89 composed of double stacked plates is fixed to an upper portion of the muffler 20, and is mounted to the muffler supporting portion 50. Specifically, as shown in FIG. 7, a grommet 90 formed of an elastic body such as rubber is fitted into the supporting hole 52 of the muffler supporting portion 50 while the grommet 90 is elastically deformed, and a bushing 91 having flange portions 91a at opposite ends thereof is inserted in a hollow portion of the grommet 90.

The supporting piece 89 is positioned relative to the muffler supporting portion 50 such that a screw insertion hole 92 provided in the supporting piece 89 coincides with a hollow portion 91b of the bushing 91 of the muffler supporting portion 50, and a cap 93 is fitted to the outer side of the bushing 91. The screw member 98 is inserted into a screw insertion hole 94 provided in the cap 93, the hollow portion 91b of the bushing 91 and the screw insertion hole 92 of the supporting piece 89, and then, is tightened with a nut 99. By so doing, the upper portion of the muffler 20 is firmly mounted to the muffler supporting portion 50 of the step stay 30. In this state, the grommet 90 serves as a vibration isolating member and suppresses vibration transmission from the step stay 30 to the muffler 20.

In the above configuration, in the step stay 30 shown in FIG. 2, the unit supporting portion 38 which supports the operation unit 25 is provided so as to project rearward from the mounting arm portion 32B at the rear side and is disposed at a position spaced upward from the tank supporting portion 42, and the pannier supporting portion 41 is disposed rearward of the unit supporting portion 38. Thus, as clearly shown in FIG. 1, the operation portion 55 of the operation unit 25 is supported by the step stay 30 at a position at which overlap of the operation portion 55 with the step stay 30, the reservoir tank 4 and the pannier 3 is avoided as viewed from the outer lateral side, that is, in such an arrangement that the entirety of the operation portion 55 is exposed to the outer lateral side. Therefore, the operation portion 55 can be easily grasped and rotated from the outer lateral side, and thus high operability of the operation unit 25 can be ensured.

The step stay 30 not only supports the operation unit 25 and the pannier 3, but also serves as a supporting member for the reservoir tank 4 and the muffler 20. Thus, the step stay 30 is sufficiently effectively used as a supporting member, and it is not necessary to additionally provide a supporting member for the reservoir tank 4 and the muffler 20. In addition, since both the pannier 3 and the muffler 20 are supported by the step stay 30, it is possible to ensure a positional relationship therebetween and to prevent the pannier 3 from being excessively close to the muffler 20 having a high temperature.

As shown in FIG. 6, the operation unit 25 is supported by the step stay 30 via the grommets 61 which form unit vibration isolating members. Thus, vibration transmitted from the step stay 30 to the operation unit 25 during the motorcycle travelling is attenuated. Accordingly, it is possible to prevent unexpected rotation of the operation portion 55 of the operation unit 25 due to the vibration. In addition, as shown in FIG. 1, the pannier 3 is supported by the step stay 30 via the vibration isolation cap 73 which forms a pannier vibration isolating member. Thus, vibration transmitted from the step stay 30 to the pannier 3 during the motorcycle travelling is attenuated. Accordingly, it is possible to suppress an article stored in the pannier 3 from vibrating.

The rotation axis C of the operation unit 25 is set so as to be substantially parallel to the lower edge of the rear frame 2 which extends rearward and upward, the tank supporting portion 42 which supports the reservoir tank 4 is disposed rearward of and below the unit supporting portion 38 which supports the operation unit 25 shown in FIG. 4, and the pannier supporting portion 41 which supports the pannier 3 is disposed rearward of the tank supporting portion 42. Since the operation unit 25 is inclined so as to extend rearward and upward as described above, a large space appears rearward of and below the operation unit 25, and thus the tank supporting portion 42 for the reservoir tank 4 and the pannier supporting portion 41 for the pannier 3 are easily disposed rearward of and below the unit supporting portion 38 so as to be sufficiently away from the operation unit 25. As a result, the operation portion 55 of the operation unit 25 can be easily disposed at a position at which overlap of the operation portion 55 with the step stay 30, the reservoir tank 4 and the pannier 3 is avoided as viewed from the outer lateral side and the operation portion 55 is exposed to the outer lateral side.

As clearly shown in FIG. 4, the tick marks 56 for indicating an amount of an operation of the operation portion 55 are provided on the unit body portion 54 of the operation unit 25. Thus, by manually operating the operation portion 55 while viewing the tick marks 56, it is possible to quickly and accurately adjust the characteristic of the rear wheel shock absorber 24, whereby the operability of the operation unit 25 improves.

The present invention is not limited to the above-described embodiment, and various additions, changes, or deletions can be made without departing from the gist of the present invention, and therefore, are to be construed as included within the scope of the present invention.

REFERENCE NUMERALS

3 . . . pannier
4 . . . reservoir tank
20 . . . muffler
24 . . . rear wheel shock absorber
25 . . . operation unit
28 . . . foot step
30 . . . step stay
38 . . . unit supporting portion
41 . . . pannier supporting portion
42 . . . tank supporting portion
50 . . . muffler supporting portion
55 . . . operation portion
56 . . . tick mark
61 . . . grommet (unit vibration isolating member)
73 . . . vibration isolation cap (pannier vibration isolating member)
C . . . rotation axis
FR . . . motorcycle frame structure

What is claimed is:

1. A motorcycle comprising:
a motorcycle frame structure;
a foot step for a passenger;
a rear wheel shock absorber;
an operation unit for manually adjusting a characteristic of the rear wheel shock absorber;
a reservoir tank for rear wheel brake oil; and
a step stay mounted to the motorcycle frame structure and configured to support the foot step, wherein
the step stay comprises:
a unit supporting portion configured to support the operation unit with the use of a first screw member;
a tank supporting portion configured to support the reservoir tank with with the use of a second screw member; and
a pannier supporting portion configured to support a front portion of a pannier for accommodating an article, the pannier supporting portion being engaged in a support reception portion defined at the front portion of the pannier thereby to support the front portion of the pannier when the pannier is mounted to a side portion of a motorcycle body, the pannier supporting portion is disposed rearward of the unit supporting portion, and an operation portion of the operation unit is disposed at a position at which overlap of the operation portion with the step stay and the pannier is avoided as viewed from an outer lateral side.

2. The motorcycle as claimed in claim 1, further comprising a muffler disposed at a lateral side of a rear wheel, wherein the step stay includes a muffler supporting portion configured to support the muffler.

3. The motorcycle as claimed in claim 1, wherein the operation unit is supported by the step stay via a unit vibration isolating member.

4. The motorcycle as claimed in claim 1, further comprising the pannier, wherein the pannier is supported by the step stay via a pannier vibration isolating member.

5. The motorcycle as claimed in claim 1, further comprising the pannier, wherein:
 the operation unit has a rotation axis set so as to be substantially parallel to a lower edge of a rear frame of the motorcycle body which lower edge extends rearward and upward;
 the tank supporting portion is disposed rearward of and below the unit supporting portion; and
 the pannier supporting portion is disposed rearward of the tank supporting portion.

6. The motorcycle as claimed in claim 1, wherein a tick mark for indicating an amount of operation of the operation unit is provided on the operation unit.

* * * * *